United States Patent [19]
Neff

[11] 3,947,905
[45] Apr. 6, 1976

[54] MULTI-PURPOSE ELECTRICAL WIRING TOOLS

[76] Inventor: Ted Neff, 24921 Muirlands Blvd. Sp. 203, El Toro, Calif. 92630

[22] Filed: Mar. 12, 1975

[21] Appl. No.: 557,456

[52] U.S. Cl. .................................................. 7/5.6
[51] Int. Cl.² ...................... B25B 7/22; H02G 1/12
[58] Field of Search ............ 7/5.1, 5.2, 5.3, 5.4, 5.5, 7/5.6; 30/90.1; 81/9.5 R

[56] References Cited
UNITED STATES PATENTS

| | | | |
|---|---|---|---|
| 2,925,652 | 2/1960 | Lundquist | 7/5.3 X |
| 3,525,107 | 8/1970 | Hays | 7/5.3 |
| 3,654,647 | 4/1972 | Neff | 7/5.3 |
| 3,831,207 | 9/1974 | Boyajian | 7/5.6 |

FOREIGN PATENTS OR APPLICATIONS

| | | | |
|---|---|---|---|
| 1,310,734 | 10/1962 | France | 7/5.4 |
| 673,358 | 10/1963 | Canada | 7/5.3 |

*Primary Examiner*—Al Lawrence Smith
*Assistant Examiner*—Roscoe V. Parker

[57] ABSTRACT

This invention relates to a multi-purpose hand tool primarily for use on electrical wiring which combines into one tool all of the necessary elements required to perform gripping, pulling, bending, cutting, stripping, crimping, and shearing operations normally encountered in electrical wiring jobs. The tool encludes needle-nose plier-like jaws for gripping, pulling, and bending wire as well as for turning small nuts and bolts; stripping means for stripping insulation from electrical wire; cutting means for cutting wire; shearing means for shearing small bolts and screws; and crimping means for crimping terminals on wire, including automotive ignition wiring. The operating elements are disposed to take maximum advantage of the physical law of leverage, while at the same time providing a maximum number of elements for the widest possible application.

1 Claim, 8 Drawing Figures

MULTI-PURPOSE ELECTRICAL WIRING TOOLS

BACKGROUND OF THE INVENTION

This invention is an improvement over those contained in U.S. Pat. No. Des. 218,141 and No. 3,654,647, issued in the name of the applicant, in which gripping jaws were first incorporated into a tool of the type comprising the invention. The tool covered by said patents contains practically all of the features of the present invention, but it has since been found that, in actual application, the location of the various elements and their relation to one another is of considerably more importance than was originally thought and the optimum condition has not been Reached in any such multi-purpose tool heretofore, including that of applicant in the mentioned patents. For example, the cutting means positioned to the rear of the pivot axis is not the best location due to awkwardness of trying to cut wire in that position, especially if the wire is already attached to an assembly and is in a relatively restricted location. It has been found that the multiple stripping and crimping operations can be performed with equal facility from either side of the pivot axis as they are usually performed on the loose end of a wire where there is seldom the problem of restricted space. However, the crimping means should take priority over the stripping means in being located nearest the pivot axis due to more force being required to perform the crimping operations. Of course, the cutting, stripping, and crimping means could all be located forward of the pivot axis; but in doing so, other problems are created as will be pointed out hereinbelow in describing the state of the prior art, in which the mechanical advantage of leverage would be lost to some degree.

Another mechanical advantage that has long been recognized and which is desireable in a tool of the type under discussion is a cutting means that utilizes a scissor-like cutting action where one cutting edge bypasses the other in a shearing action, as opposed to a cutting action where the two cutting edges come together in the same plane in abutting relationship. This squeeze-type of cutting action is less effective due to the fact that a nick in either of the cutting edges, or dull cutting edges, will result in an incomplete cut. The same defects, however, have much less effect upon a scissor-type cutter due to the shearing action of the bypassing cutting edges. Consequently, to fully understand the importance of location as well as configuration, one must look at the tools available prior to the instant invention to realize what their shortcomings are and how the present invention is superior in every respect. In a most recent example of the current state of the art, some recognition is given to the importance of location of the operating elements in relation to the pivot axis. However, four of the elements are located forward of the pivot axis and only one is located partly to the rear of the pivot axis (the shearing means, placed in an arc partly around the pivot axis). No elements are placed beyond the flat planar sections immediately surrounding the pivot axis to the rear of the tool. This placement creates a number of problems and disadvantages that cannot be overcome in the concept used. To be more explicit, the concept fails to take full advantage of the leverage principle on both sides of the pivot axis. Instead, four of the five elements are crowded onto the forward side, and in doing so, the space limitation dictated a reduction in the number of a given element that can be used; for example, fewer crimping elements and fewer stripping elements. In addition, the crowding together of most of the elements on the forward side of the pivot axis necessitated the use of the less effective squeeze-type of cutting with abutting cutting edges in order to avoid at least three angular offsets in the forward portions of the tool if the same order of placement were maintained for the elements. That many offsets would not be desireable from a manufacturing standpoint just for the sake of obtaining the scissor-like cutting action. Lastly, the favored location for the best mechanical advantage nearest the pivot axis can only be assigned to one element in this concept, thereby materially reducing the ease with which all of the other elements can be operated.

Other tools using different concepts than the one used as an example have had elements on both sides of the pivot axis, but heretofore there has not been a multi-purpose tool of the type comprising this invention which has brought all of the factors together to take optimum advantage of mechanical leverage combined with the best location for the various elements, and still have a maximum number of elements in the tool for the widest possible application.

A primary object of this invention, therefore, is to provide a multi-purpose tool having all of the necessary functional elements to perform any task connected with an electrical wiring job of whatever nature, including those connected with automotive electrical work, and accomplish this objective in such a manner that the mechanical advantage given to one element will not detract significantly from the mechanical advantage given another requiring near equal force application.

A related object is to locate the operating elements of the tool in such a manner that each has optimum mechanical advantage, in order of force required to operate it, and without the necessity for eliminating any desireable elements that would add to the utility of the tool.

Another object is to provide such a tool that is fairly simple and attractive in appearance, economical to manufacture, and easy to operate.

SUMMARY OF THE INVENTION

The above mentioned objects of this invention have been attained in a multi-purpose tool comprising a pair of operating members joined together pivotably in side-by-side sliding relationship by a pivot member. The pivot member is located in a cylindrical bore extending through said operating members substantially in the center of two flat sections intermediate extending portions to either side of the pivot axis formed by the pivot member. Extending rearwardly of the tool on one side of the pivot axis are two extending portions having sections angularly offset toward each other from the side-by-side plane into a common plane rearwardly from that point on to the end of the tool. These offset sections are immediately adjacent and to the rear of the flat sections in which the pivot member is located. Immediately adjacent and to the rear of the offset sections is a crimping means for crimping relatively large solderless electrical wiring terminals primarily of the non-insulated type. Immediately to the rear of this first crimping means is a second crimping means for the purpose of crimping the larger sizes of insulated electrical terminals. Immediately adjacent and to the rear of the second crimping means is a third crimping means primarily for crimping insulated electrical terminals in the intermediate and smaller sizes and non-insulated terminals in the smaller sizes. These first three crimping means are all beveled on one side so as to have a narrower edge pressing against the terminal being crimped and thus make the crimping job easier to accomplish than would be the case if the edges were left at full width. Immediately adjacent and to the rear of the third crimping means is a fourth crimping means for the purpose of crimping automotive ignition wiring terminals. Although the fourth crimping means is somewhat larger than the other three, less crimping force is required than for the others, hence the reason for its location last in line and fartherest from the pivot axis. The other three crimping means are aligned rearward away from the pivot axis in order of decreasing force required to perform their respective functions. Immediately to the rear of the fourth crimping means, the two rearwardly extending portions separate and form two spaced-apart handles.

On the opposite, or forward side of the pivot axis, the two operating members have two forwardly extending portions forming the front part of the tool. These two portions contain cutting means immediately adjacent and forward of the two flat sections, the cutting means consisting of beveled cutting edges, with the bevels on opposite sides of the tool to permit the cutting edges to bypass each other in a scissor-like cutting action as the forwardly extending portions are closed toward each other, the extending portions still being in side-by-side parallel but offset planes at this point. Immediately adjacent and forward of the cutting means are a number of stripping means composed of sharp-edged circular apertures, in this case six, formed by beveled arcuate recesses in opposite sides of the two forwardly extending portions. The circular apertures are formed when the forwardly extending portions are closed together and are of graduated, progressively smaller diameters as they are positioned progressively farther away from the pivot axis of the tool. These sharp-edged stripping means are for stripping insulation from electrical wires of varying diameters without cutting the wire itself. The positioning is such that the element requiring the most force to operate it is positioned closest to the pivot axis, with the others located progressively farther away as the force to operate them progressively decreases in direct relation to the decrease in diameter. Immediately adjacent and forward of the forwardmost stripping means, the forwardly extending portions have sections angularly offset toward each other so as to extend forward from this point on in a common plane and form gripping jaws at the forward end of the tool. A series of cylindrical bores, in this case six, are located on each of the flat sections near to and completely encircling the pivot axis. These bores are equidistant from the pivot axis and also from each other, and are of different sizes. The bores cooperate with each other by becoming axially aligned when the operating members are opened to a given point, at which position bolts or screws of the proper size to fit the bores (not shown) may be inserted to be sheared. The shearing is accomplished by closing the handles of the operating members toward each other, thereby causing the misalignment of the bores and exerting a shearing action on the bolts or screws.

DETAILED DESCRIPTION

Figure 1:
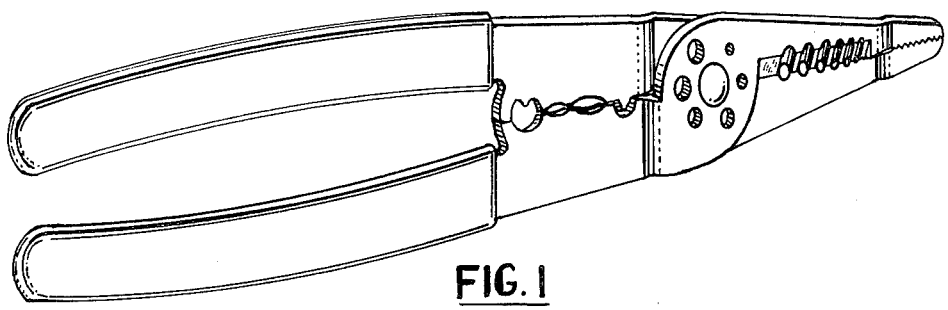
FIG. 1 is a perspective view of the multi-purpose tool comprising the invention.

Referring now to the drawings, FIG. 1 shows a tool having substantially identical operating members 10 and 10A joined together by a pivot member 11 in a bore 12 which extends through members 10 and 10A on a common axis in substantially the center of corresponding flat sections 13 and 13A. Sections 13 and 13A pivot in opposite directions in sliding, scissor-like relationship to one another to open and close operating members 10 and 10A in scissor-like fashion. Immediately adjacent and to the rear of flat sections 13 and 13A, rearwardly extending portions 14 and 14A are shown as having sections 15 and 15A angularly offset toward each other from the side-by-side sliding plane so as to extend rearwardly in a common plane from that point on to the rear end of the tool. The first of at least four crimping means is shown as being comprised of an arcuate recess 16 in the inwardly facing edge of portion 14 and a blunt, tooth-like projection 17 protruding from the inwardly facing edge of portion 14A. Tooth-like projection 17 extends across the central longitudinal axis of the tool and into recess 16. This first crimping means is primarily for crimping non-insulated terminals and some larger sizes of insulated terminals. It is placed first in line to the rear of the flat sections 13 and 13A because of the force required to crimp the larger terminals, thus taking optimum advantage of the leverage force available at that point. A second crimping means is immediately adjacent and to the rear of the first crimping means and is comprised of a shallow arcuate recess 19 on the inner edge of portion 14 and a second shallow recess 19A in opposing relationship to recess 19 on the inner edge of portion 14A. This second crimping means is primarily for crimping the intermediate sizes of insulated terminals onto a conductor wire and is located second in order of closeness to the pivot axis as it requires slightly less force to perform its crimping operation than does the first crimping means. A third crimping means is located adjacent and immediately to the rear of the second crimping means and is comprised of a shallow arcuate recess 20 in portion 14 facing an opposed shallow recess 20A in portion 14A. Recesses 20 and 20A are somewhat smaller than recesses 19 and 19A, and are primarily for crimping the smaller sizes of electrical terminals of the insulated type. A fourth crimping means is provided by a semicircular recess 21 on the inner edge of portion 14 immediately adjacent and to the rear of the third crimping means, and an opposed semi-circular recess 21A on the inner edge of portion 14A. A small, blunt, tooth-like projection 22 extends inwardly into the circular opening formed by recesses 21 and 21A. Small projection 22 aids in the crimping operation by deforming the terminal barrel (not shown) inwardly on a conductor wire, thereby securely attaching the terminal to the wire. This fourth crimping means is primarily for crimping terminals on the ends of automotive ignition wires, and completes the wide range of crimping operations that this tool invention can perform; a range that no known existing tool can match. It is pointed out that, in the unlikely event some difficulty is encountered in performing a crimping operation in any of the last three crimping means, the job can be moved up into the first crimping means where more leverage is available to complete the job with ease. Regardless of whether the crimping job is industrial, household, or automotive, the present invention is capable of handling it. To complete the description of the rearwardly extending portions 14 and 14A, it is seen that they project beyond the fourth crimping means and form two operating handles 23 and 23A, the handles being spaced apart for their entire length to provide a comfortable hand grip for operating the tool.

Moving now to the forward end of the tool as illustrated in the drawings, there are two forwardly extending portions 24 and 24A. Immediately adjacent and forward of flat sections 13 and 13A is a cutting means comprised of two beveled cutting edges 25 and 25A. It will be noted that bevels 26 and 26A are on opposite sides of the tool and in parallel planes in order for the cutting edges 25 and 25A to bypass each other in a scissor-like shearing action. The cutting means is located first in line on the forward side of the flat sections 13 and 13A as this element requires more force to perform its operation than any of the elements located farther from the pivot axis on the forward side of the tool. Its position, therefore, takes full advantage of the leverage principle. Immediately adjacent and forward of the cutting means are, in this case, six stripping means which are formed by cooperating sharp-edged arcuate recesses 27 and 27A on opposing edges of portions 24 and 24A. It will be noted that the more advantageous scissor-like shearing action used for the cutting means is also used for the stripping means to provide cleaner cuts than would be possible with an abutting type of stripping means where the two edges come together in abutting relationship. If the abutting type were used, portions of the insulation could be left uncut if there were any nicks in the abutting edges or if the edges have become dull. The six stripping means shown cover a corresponding number of different wire sizes and are arranged outwardly from the pivot axis in decreasing order of force required to perform the insulation cutting and stripping operations. Thus, the mechanical advantage of the lever is again utilized to the fullest extent possible in the placement of the elements of the tool. Immediately adjacent and forward of the smallest and outermost stripping means, extending portions 24 and 24A have sections 28 and 28A which are angularly offset toward each other out of parallel offset planes and into a common plane so as to extend forward and form cooperating jaws 29 and 29A, said jaws having serrated surfaces 30 and 30A on their inner edges for the purpose of gripping, pulling, and bending wire, as well as for gripping and turning small nuts and bolts associated with most electrical installations.

Figures 2, 4, 5:
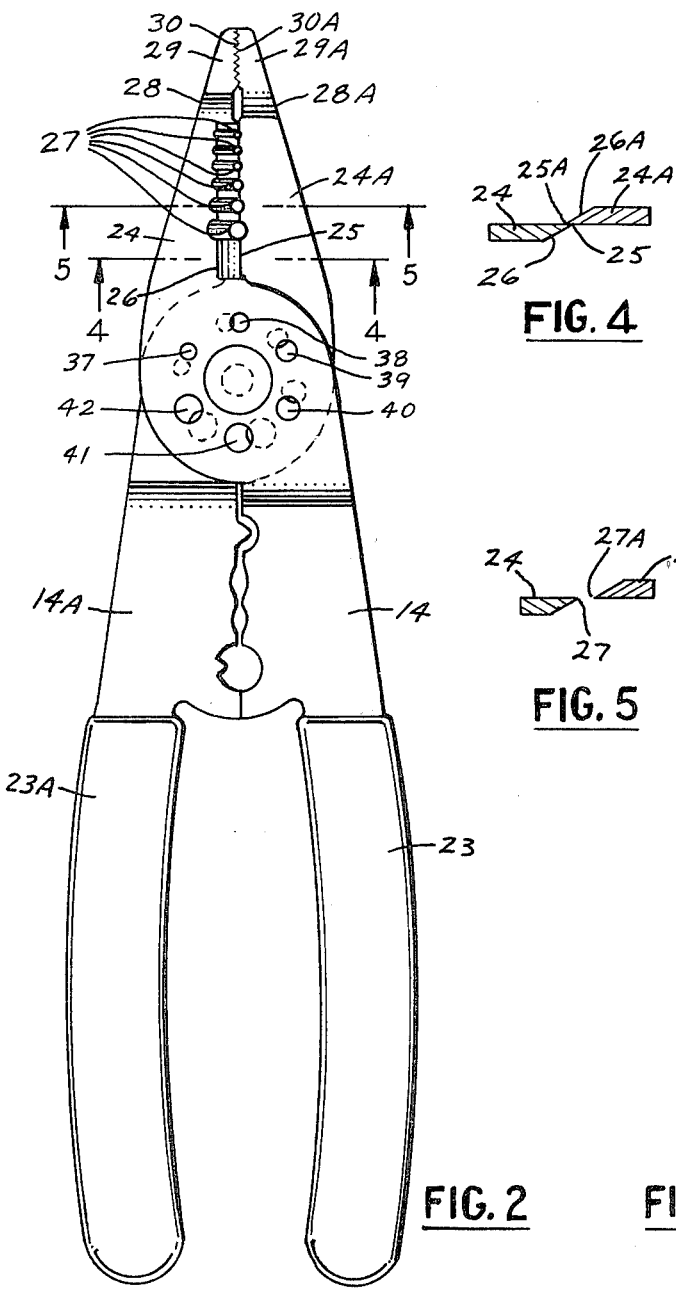
FIG. 2 is a side elevational view with the operating members in the closed position.
FIG. 4 is a sectional view taken along line 4—4 of FIG. 2.
FIG. 5 is a sectional view along line 5—5 of FIG. 2.
Figure 3:
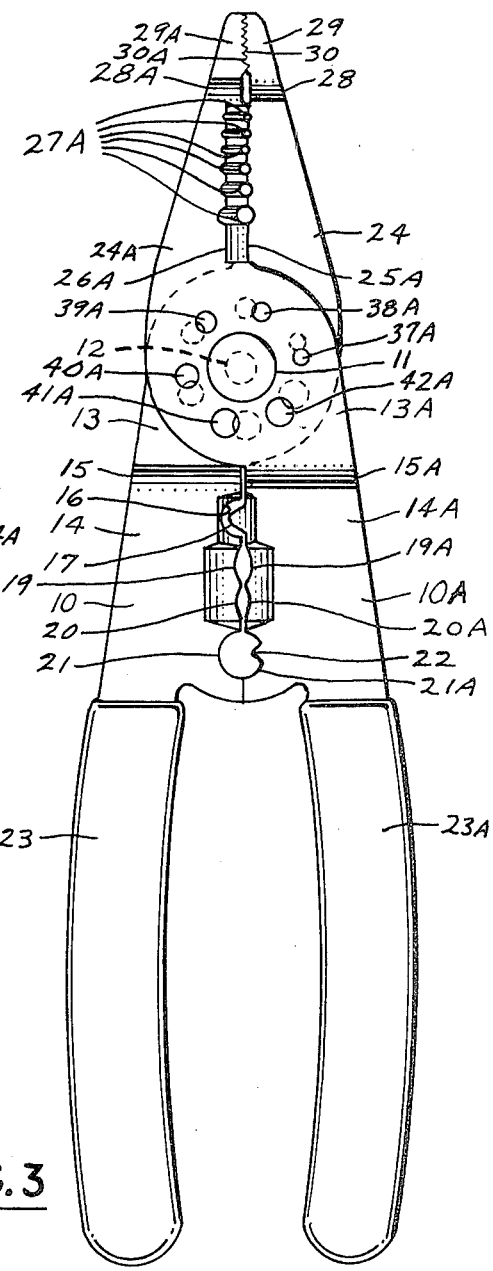
FIG. 3 is a side elevational view of the opposite side of the tool from that shown in FIG. 2.
Figure 6:
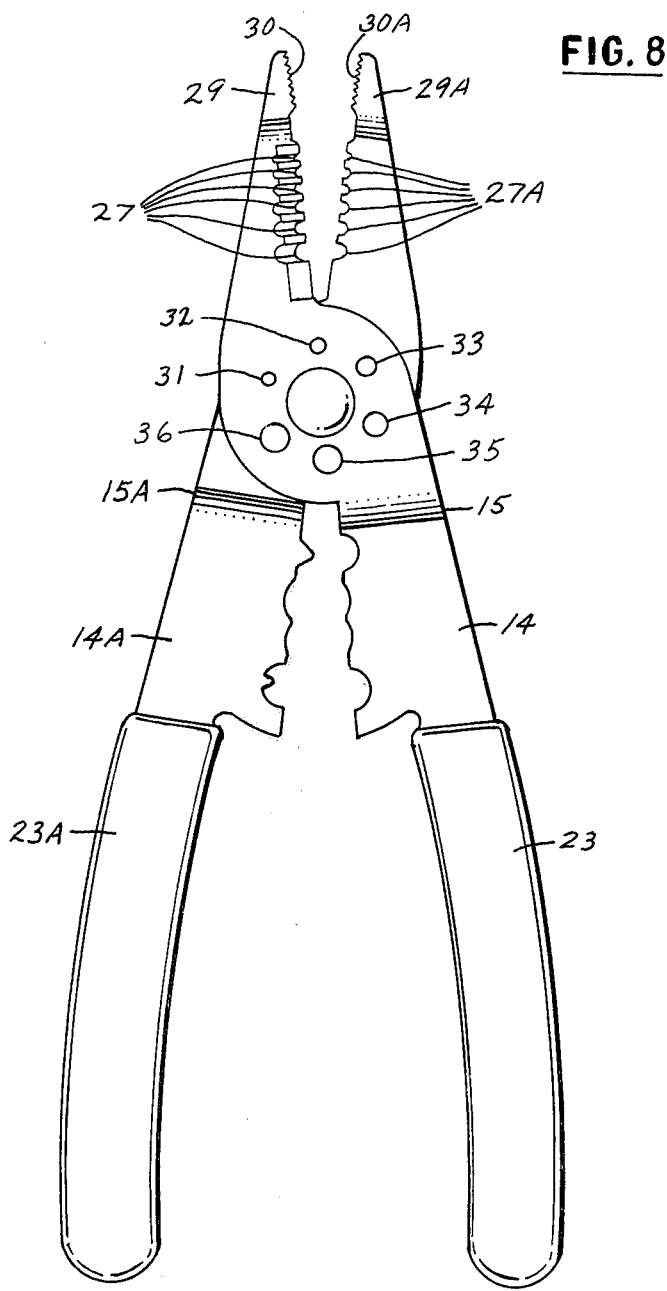
FIG. 6 is a side elevational view of the tool with the operating members in the open position.
Figure 7:
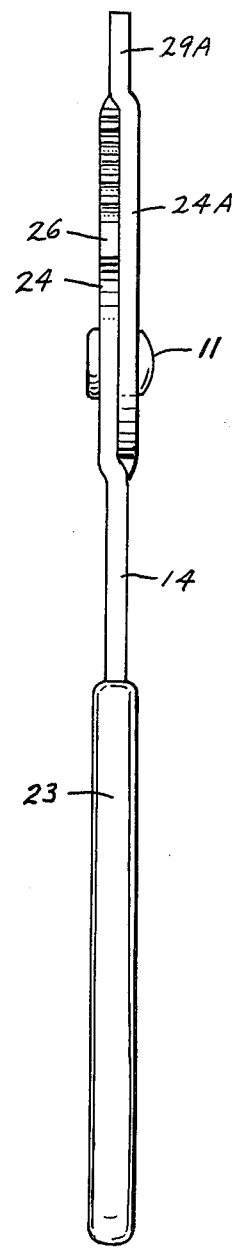
FIG. 7 is an edge elevational view of the tool.

It will be noted that the rearmost element, the fourth crimping means, is approximately the same distance from the pivot axis as the forwardmost element, the gripping jaws. By the same token, the next elements in line closer to the pivot axis on the rear side, the small and intermediate crimping means, are approximately the same distance from the pivot axis as are the stripping means on the forward part of the tool, therefore having approximately equal mechanical advantage in relation to the pivot axis. The next elements in line and still moving closer to the pivot axis are the large crimping means and the cutting means on the rear and forward sides of the tool respectively, they also having equal mechanical advantage based upon the leverage principle. Proceeding to the remaining elements of the tool, shearing means 31-36 are disposed on flat sections 13 and 13A in a complete circle around the pivot axis. Said shearing means are located as near as conveniently possible to the pivot axis due to more force being required to perform the shearing action than any other element and are equidistant therefrom as well as from each other. Shearing means 31-36 are composed of, in the preferred form of the invention, six bores of different sizes, 37-42, extending through flat section 13 and cooperating with six other bores 37A-42A in flat section 13A. When the operating members 10 and 10A are pivoted to a given point in the open position as shown in FIG. 6, bores 37-42 and 37A-42A become aligned on a common axis to permit the insertion of bolts or screws (not shown) to be sheared. The shearing is accomplished by pivoting the operating members 10 and 10A toward the closed position as shown in FIGS. 2 and 3, thereby causing the misalignment of the opposing bores and producing a shearing action on the bolts or screws.

Note should be taken of the fact that the grinding or broaching operation required to form the cutting and stripping means on the two opposed operating members are exactly identical and can be done simultaneously in the same tooling fixture, there being no need to distinguish between "left" and "right" member as far as this manufacturing operation is concerned as would be required if the cutting and stripping means were of the abutting type. This feature, comprising a part of the total inventive process, is an important one from the standpoint of meeting the the objective of economy of manufacture.

Figure 8:
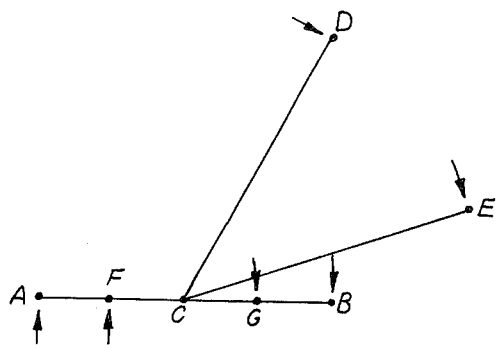
FIG. 8 is an illustration of the physical law of the lever, which has been most effectively applied in the invention.

In applying the leverage principle as illustrated in FIG. 8, full usage has been made of the fact that the same mechanical advantage exists at point B as at point A, regardless of the direction from which the leverage is applied. In other words, applying the physical law of the lever, C represents the pivot axis, and D and E represent two alternate points of force application in the direction of the arrows. If A is the same distance from C as is B, then the force applied at A would be the same as that applied at B in the direction of the arrows. By the same token, the force applied at points F and G would also be the same, but would be double the force being applied at A and B because of their distance from C being only half that of A and B. Thus the elements of the tool that are placed closer to the pivot axis of the tool enjoy a greater mechanical advantage to assist them in the performance of their respective operations. By placing the hardest to operate closest to the pivot axis and the others in decreasing order of difficulty away from the pivot axis, it can be seen that all can be operated with fairly equal facility if equally distributed on both sides of the pivot axis.

In summation, applicant has, for the first time, combined all of the elements into one tool that are required to perform the widest variety of electrical jobs, and this combination has been achieved without detracting from the utility of any of the operating elements. There are in this one tool a total of 18 operating elements; four crimping means, six shearing means, one cutting means, six stripping means, and one gripping means. Applicant knows of no other tool having so many elements combined so effectively into a single tool in such a manner as to take full advantage of leverage forces for every element. Not a single element has been located where it will detract from the most efficient operation of any other element, as is so common in other multi-purpose tools of this general classification.

Having thus described the invention, what I claim is:

1. A multi-purpose tool comprising: A pair of operating members pivotably connected together in sliding relationship by a pivot member disposed in a pair of bores having a common pivot axis, said pivot member and bores being located in substantially the center of corresponding flat sections on each of said operating members, a pair of rearwardly extending portions disposed on one side of said flat sections and said pivot axis, said rearwardly extending portions having sections angularly offset toward each other immediately adjacent said flat sections so as to extend rearwardly in a common plane, at least four crimping means on said rearwardly extending portions, the first of which is immediately adjacent said offset sections and rearward thereof, said first crimping means consisting of an arcuate recess in the inwardly facing edge of one of the rearwardly extending portions, a tooth-like projection on the inwardly facing edge of the other rearwardly extending portion and opposite said recess, said projection extending across the central longitudinal axis of the tool and into said recess, a second crimping means immediately adjacent and to the rear of said first crimping means, said second crimping means being comprised of similar, relatively flat, arcuate recesses disposed opposite each other on the inner edges of said rearwardly extending portions, thereby forming a substantially oval-shaped opening when said extending portions are in a closed position, a third crimping means immediately adjacent and rearward of said second crimping means comprised of a pair of arcuate recesses similar to but smaller than those of said second crimping means, a fourth crimping means disposed immediately adjacent and rearward of said third crimping means and being comprised of a first semi-circular recess disposed on the inner edge of one of said rearwardly extending portions, a second semi-circular recess on the inner edge of the other rearwardly extending portion and cooperating with said first recess, said second recess further having a small tooth-like projection in the bottom of said recess and extending inwardly into a substantially circular opening formed by said semi-circular recesses, two handles formed on said rearwardly extending portions immediately to the rear of said fourth crimping means, said handles projecting rearwardly in spaced apart relationship, a pair of forwardly extending portions disposed on the opposite side of said flat sections and said pivot axis and extending in parallel but offset planes for most of their length and in a common plane for the balance of their length, said forwardly extending portions containing cutting means immediately adjacent said flat sections, said cutting means consisting of cooperating beveled sections forming sharp cutting edges disposed on opposite inner edges of said forwardly extending portions, said beveled sections being disposed on opposite sides of said tool so the cutting edges will bypass each other in a scissor-like shearing action when said forwardly extending portions are closed together, wire-stripping means immediately adjacent and forward of said cutting means, said stripping means consisting of six pairs of cooperating arcuate recesses on oppositely facing inner edges of said forwardly extending portions, each of said pairs forming sharp-edged circular openings when said forwardly extending portions are closed together, said pairs of arcuate recesses partially bypassing each other in a scissor-like shearing action, said circular openings forming said stripping means being of progressively smaller diameters with the smallest thereof being positioned fartherest away from said pivot axis of said tool, said forwardly extending portions having sections angularly offset toward each other out of said parallel offset planes and into a common plane, said offset sections being disposed immediately forward of said smallest stripping means, said forwardly extending portions remaining in said common plane for the balance of their length, a pair of gripping jaws immediately forward of said offset sections, said jaws having oppositely facing serrated surfaces on their inner edges in abutting relationship for the purpose of gripping various objects, shearing means consisting of six pairs of differently sized bores disposed on said flat sections, one of each pair being located on each of said flat sections, said pairs of bores cooperating with each other in axial alignment when said operating members are opened to a given point, at which point a bolt or screw may be inserted therethrough for shearing, said shearing being accomplished when said operating members are pivoted toward a closed position, thereby misaligning said bores and causing a shearing action on said bolt or screw, said bores further being disposed in a circular pattern completely around said pivot axis in said flat sections, and being equidistant from said pivot axis and equidistant from each other.

* * * * *